United States Patent [19]

Liu

[11] Patent Number: 5,376,977
[45] Date of Patent: Dec. 27, 1994

[54] GLASSES STRUCTURE FOR ADVERTISING

[76] Inventor: Chin-Fen Liu, No. 63-1, West Alishan, Chia-Yi Hsien, R.O.C.

[21] Appl. No.: 118,735

[22] Filed: Sep. 10, 1993

[51] Int. Cl.⁵ .................................................. G02C 9/00
[52] U.S. Cl. ..................................... 351/47; 351/155; 351/158
[58] Field of Search ................. 351/47, 57, 140, 153, 351/158, 48, 58, 59, 155; 2/434

[56] References Cited

U.S. PATENT DOCUMENTS

| | | | |
|---|---|---|---|
| 2,998,610 | 9/1961 | Spero | 351/47 |
| 3,238,005 | 3/1966 | Petitto | 351/47 |
| 3,252,747 | 5/1966 | Robins | 351/59 |
| 3,713,732 | 1/1973 | Gooch | 351/153 |

Primary Examiner—William L. Sikes
Assistant Examiner—Hung Xuan Dang
Attorney, Agent, or Firm—Bacon & Thomas

[57] ABSTRACT

The present invention relates to a kind of glasses structure for advertising mainly comprising a movable cover plate, a pair of glasses and a hook mounting. The movable cover is inserted to the front frame of the glasses at the two convex pieces found on each side by means of a convex axis designed at both sides of the upper section of the glasses. The hook mounting is specially designed such that the pair of glasses can be kept at the waist to a belt and the movable cover plate can thereon be used as a very convenient means of publicity.

1 Claim, 4 Drawing Sheets

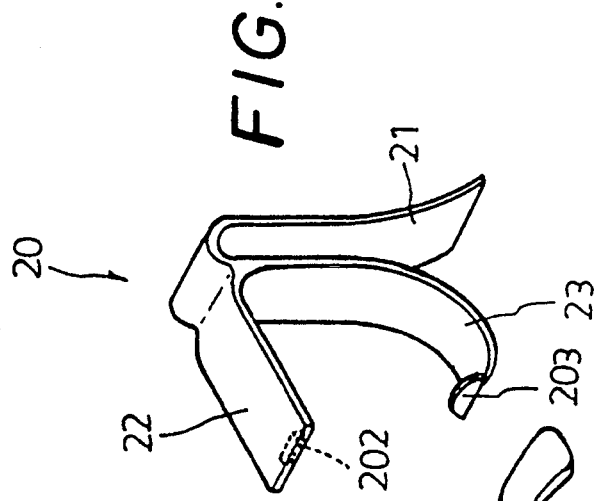
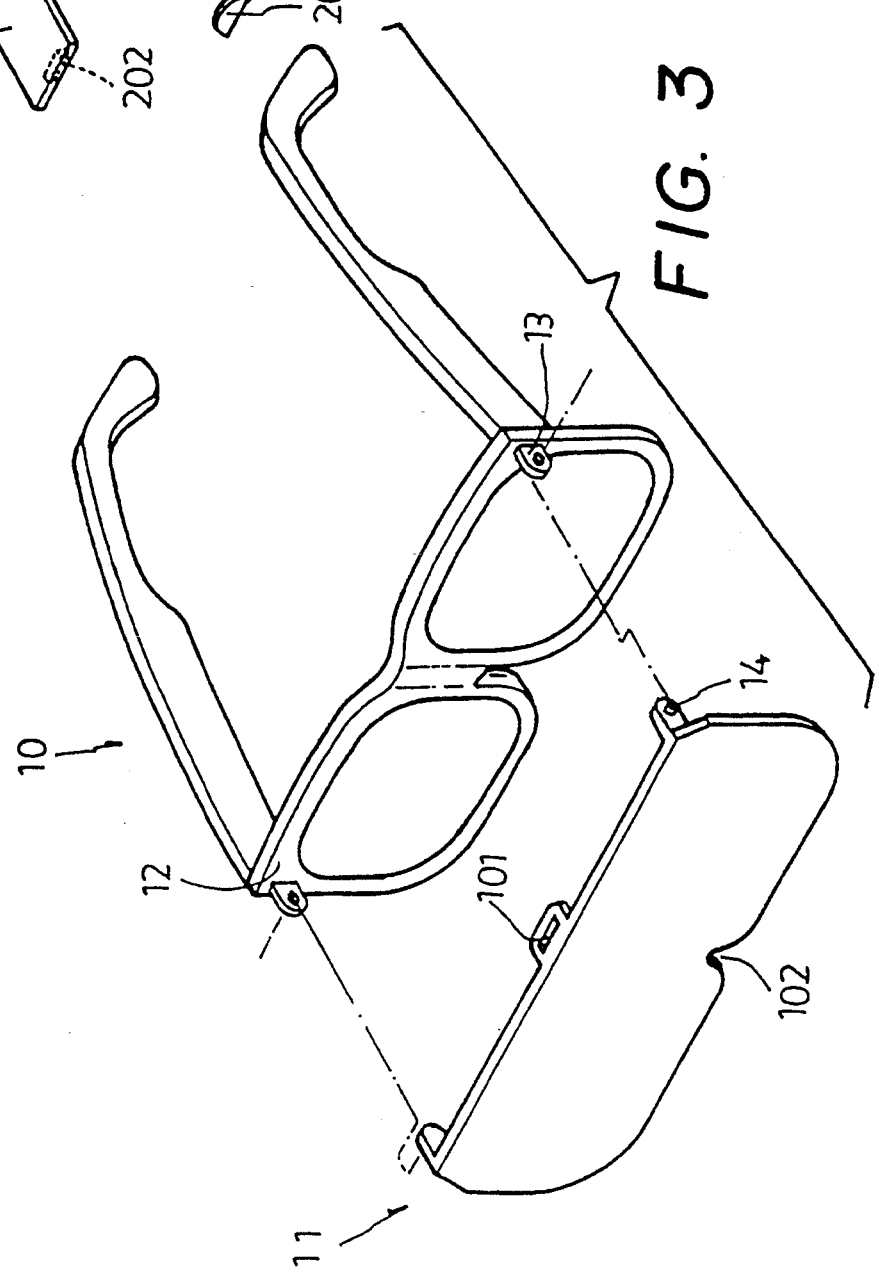

GLASSES STRUCTURE FOR ADVERTISING

BACKGROUND OF THE INVENTION

The present invention relates to a kind of portable advertising plate which is very low in capital and yet very effective. The commonly used sunglasses are usually kept inside a case at the waist and are taken out when needed. In the present invention, the case is substituted by the movable cover plate and the hook mounting such that the advertising plate can be used as a very practical, economical and effective means of advertising.

SUMMARY OF THE INVENTION

The present invention relates to a kind of glasses structure for advertising whereon publicity can be drawn onto the movable cover plate and kept at the waist. When using the glasses, the cover plate is slightly pulled up vertically and thus the structure is very practical and does not occupy any space.

Illustrations and detailed descriptions are shown below for further reference of the examiner:

BRIEF DESCRIPTION OF THE DRAWING

FIG. 3 showing a three-dimensional mounting of the present invention.

DETAILED DESCRIPTION OF THE PREFERRED EMBODIMENT

Figure 1:
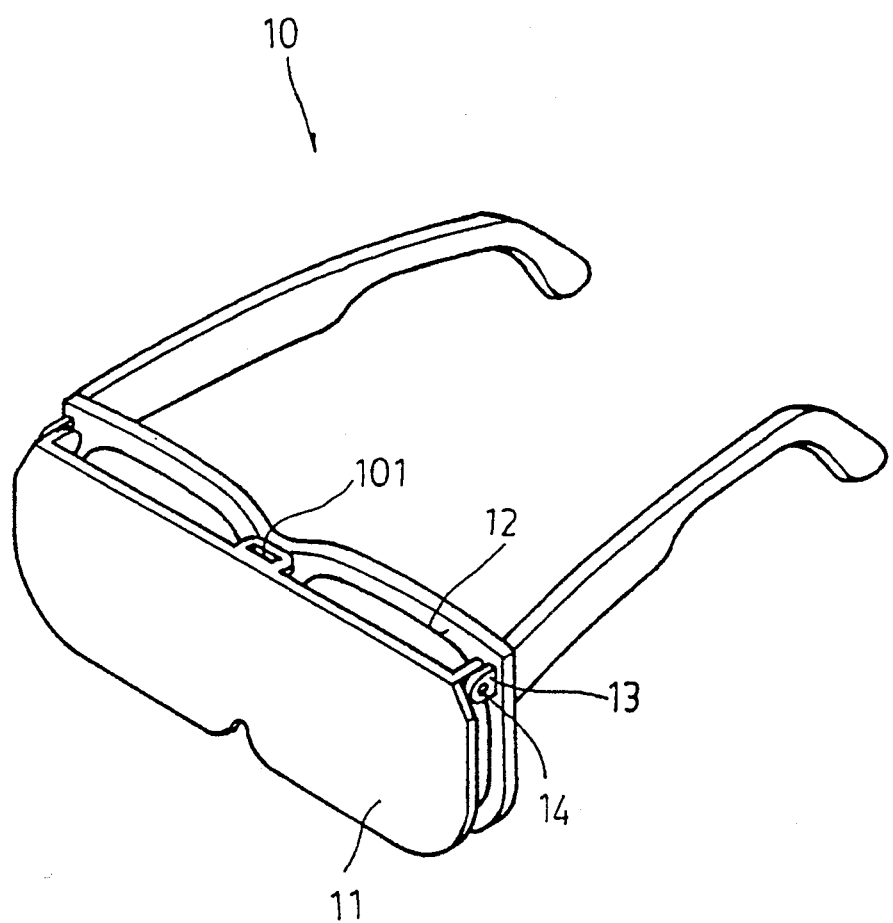
FIGS. 1, and 2 showing a sectional three-dimensional view of the present invention.
Figure 2:
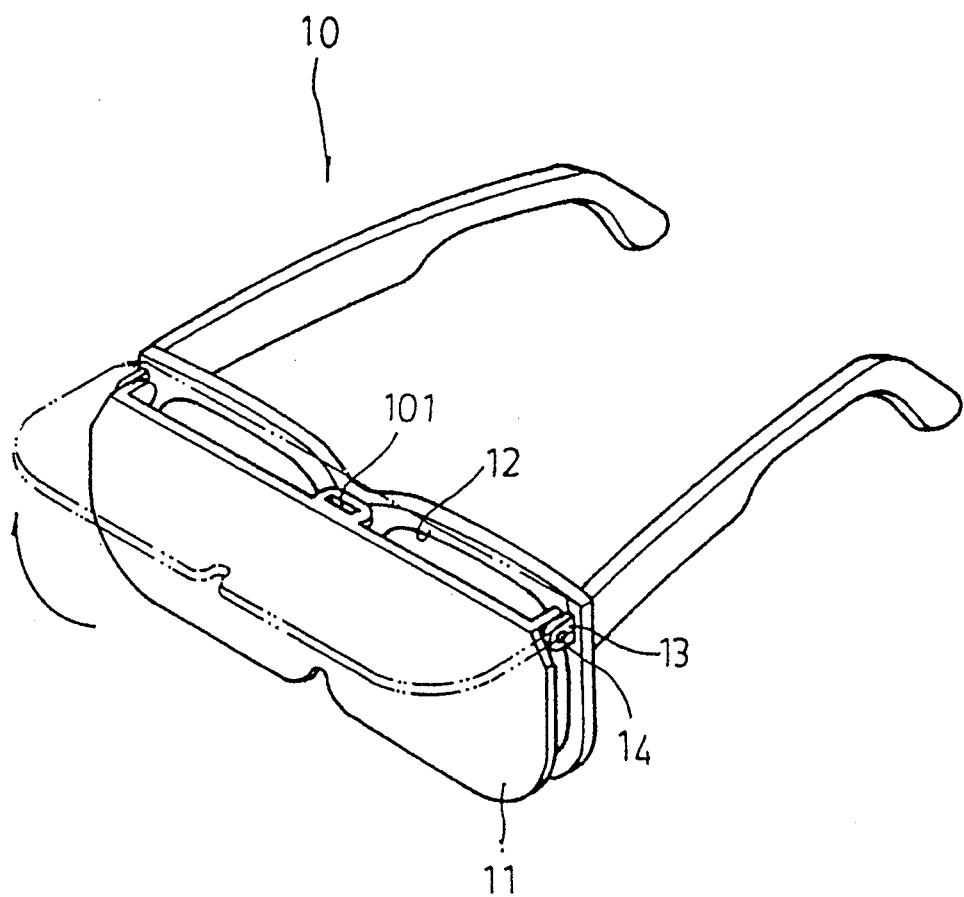

With reference to FIGS. 1 and 2 showing a sectional three-dimensional view of the present invention, a plate cover 11 is designed at the front of glasses 10 and by means of convex axis 14, is inserted into convex pieces 13 such that the cover plate can be lifted and pulled down at any time.

With reference to FIG. 3 showing a three-dimensional mounting of the present invention, the plate cover 11 is designed with a concave stand 101 to match with glasses 10 and hook mounting 20 is provided with a pincer 21 such that the glasses can be held at the waist to a belt. A convex stand 202 is also designed at the bottom edge of supporting piece 22 and is inserted into concave stand 101. Another stand 23 in an arc-like form, is designed with a hook 203 used for securing plate cover 11 at the bottom concave edge 102.

Figure 4A:
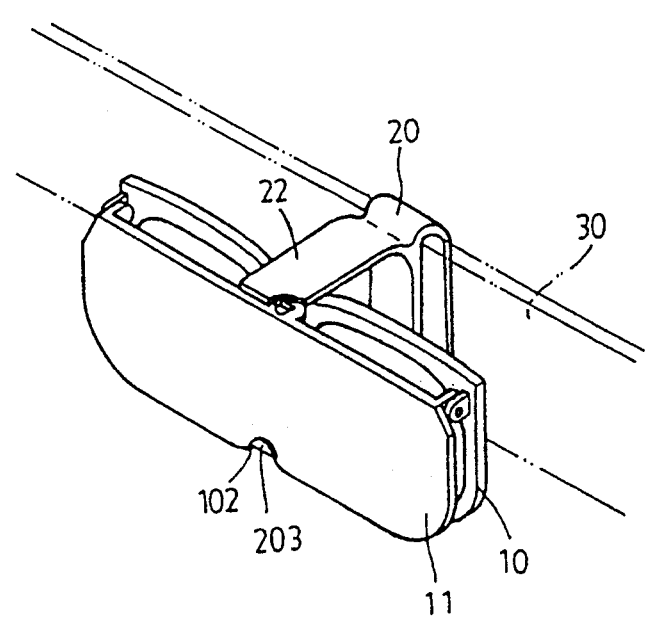
FIG. 4 showing an effective view of the present invention.
Figure 4:
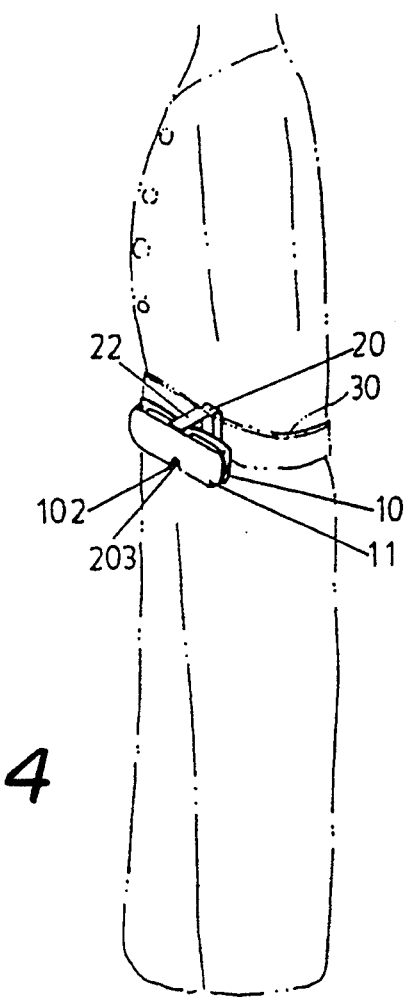

With reference to FIG. 4 showing an effective view of the present invention, when the pair of sunglasses is used as a portable publicity board, the plate cover 11 and glasses 10 are tightly secured by hook mounting 20 and kept at the waist. Further different kinds of publicity can be drawn, printed or set to plate cover 11. When the structure is used as sunglasses, convex stand 202 and concave stand 101 are separated by simply pulling the supporting piece 22 upwards while holding the glasses 10. Inversely when plate cover 11 is inserted into hook 203 at the middle concave edge 102, glasses 10 is placed into and convex stand 202 is hooked to concave stand 101, thus completing the whole process and yet being very practical for use.

Numericals:
- 11 ... plate cover
- 10 ... glasses
- 101 ... concave stand
- 20 ... hook mounting
- 21 ... pincer
- 202 ... convex stand
- 22 ... supporting piece
- 23 ... stand
- 203 ... hook
- 102 ... concave edge

I claim:

1. A kind of glasses structure for advertising comprising a movable plate cover, a pair of glasses and a hook structure characterized as below:

the plate cover is designed with a middle concave arc-like hole at the bottom, a middle concave stand at the top and a convex axis at each upper sides;

the frame at the front of the glasses is designed with a hollow convex piece at each sides to enable the convex axis of the plate cover to be thereon inserted;

the hook mounting is designed with a pincer at the back and a supporting piece at the front upper edge. Further, a convex stand is found at the bottom front edge to match with the concave stand of the plate cover. Another supporting stand in an arc-like form is also found at the bottom front edge and is itself designed with a hook to secure plate cover.

* * * * *